United States Patent [19]
Muller et al.

[11] Patent Number: 5,114,116
[45] Date of Patent: May 19, 1992

[54] ELECTROMAGNETICALLY ACTUATED QUICK-ACTION SWITCHING VALVE

[75] Inventors: Heinrich Muller, Bad Laer; Jens-Peter Wobbe, Schweppenhausen, both of Fed. Rep. of Germany

[73] Assignee: Feinmechanische Werke Mainz GmbH, Fed. Rep. of Germany

[21] Appl. No.: 656,127

[22] Filed: Feb. 14, 1991

Related U.S. Application Data

[63] Continuation of Ser. No. 447,218, Dec. 7, 1989, abandoned.

[51] Int. Cl.$^5$ ............................................. F16K 31/06
[52] U.S. Cl. ........................... 251/129.15; 251/129.21; 251/333
[58] Field of Search ............... 251/129.21, 129.15, 251/333

[56] References Cited

U.S. PATENT DOCUMENTS

| | | | |
|---|---|---|---|
| 3,285,285 | 11/1966 | Bielefeld | 137/625.65 |
| 3,588,039 | 6/1971 | Chelminski et al. | 251/129.15 |
| 4,529,165 | 7/1985 | Lehrach | 251/129.21 X |
| 4,531,708 | 7/1985 | Livet | 251/48 |
| 4,655,249 | 4/1987 | Livet | 137/625.5 |

FOREIGN PATENT DOCUMENTS 3609901 9/1987 Fed. Rep. of Germany.
3620239 12/1987 Fed. Rep. of Germany.

Primary Examiner—Arnold Rosenthal
Attorney, Agent, or Firm—Gifford, Groh, Sprinkle, Patmore and Anderson

[57] ABSTRACT

An electromagnetically actuated, quick-action hydraulic switching valve has a pressure-balanced seating valve arrangement and an electromagnetic actuator means. The electromagnetic actuator means comprises a core and an armature for actuating the valve, the core and the armature defining a working air gap. The armature is part of the core and is in the form of a sleeve member mounted slidably on a guide pin which is pressed in position in the housing. The seating valve arrangement is formed by an annular edge defined by a central bore in the armature on the one hand and on the other hand, either a taper surface on the guide pin or a ball with a bore therethrough. Using the same armature, the valve can be designed to operate either as a valve which is open in the currentless condition or as a valve which is closed in the currentless condition.

7 Claims, 4 Drawing Sheets

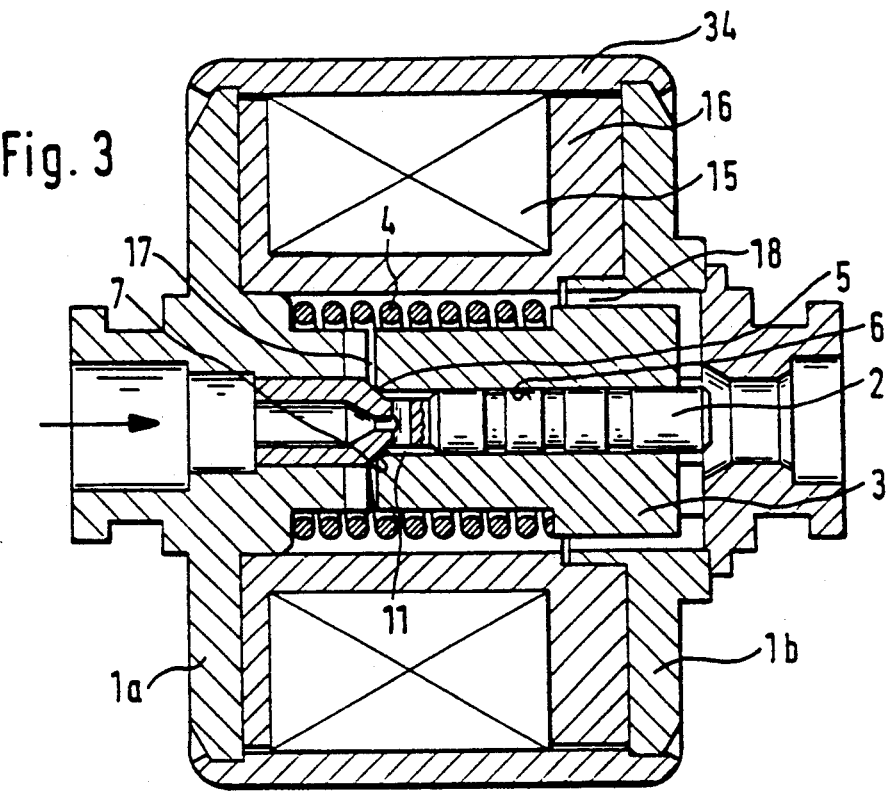
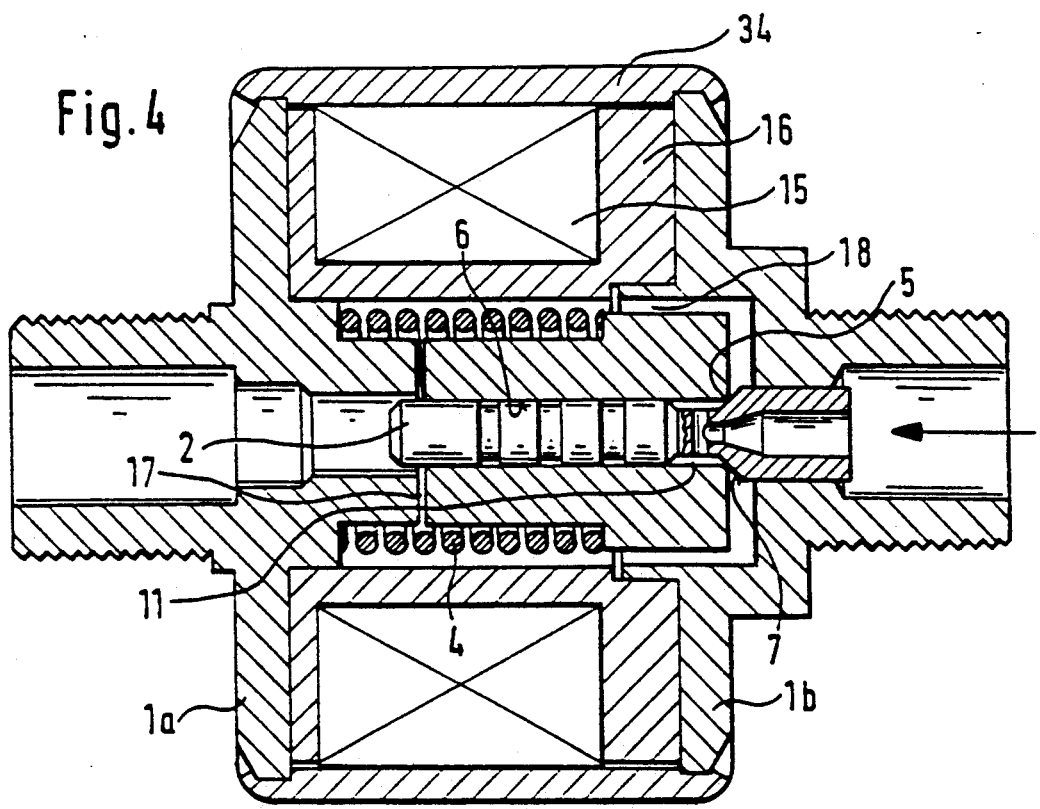

ELECTROMAGNETICALLY ACTUATED QUICK-ACTION SWITCHING VALVE

This is a continuation of copending application Ser. No. 07/447,218 filed on Dec. 7, 1989 now abandoned.

BACKGROUND OF THE INVENTION

In one form of electromagnetically actuated quick-action hydraulic switching valve, the valve comprises at least one pressure-balanced seating valve configuration and an electromagnetic actuator having a core and a movable armature for actuating the valve, the core and the armature forming a working air gap.

A valve of that design configuration may be found in German laid-open application (DE-OS) No 36 09 901 and is used in many areas as control or pilot valves, for example in anti-locking systems in motor vehicle braking installations. The valves must be reliable and durable because correct operation of the entire installation is dependent on the valves being properly operable. The switching times involved in actuation of the valves must be short, with typical actuating time values being in the millisecond range. It is also necessary for the switching times involved in actuation of the valves to lie within given tolerance ranges and not to alter as far as possible, so that it is possible to maintain the respective control characteristics required.

While the quick-action valves referred to above reliably and satisfactorily fulfill the above-indicated conditions involved in its operation they still leave something to be desired in regard to production thereof.

SUMMARY OF THE INVENTION

An object of the present invention is to provide an electromagnetically actuated, quick-action hydraulic switching valve which is durable and reliable in operation while also being of minimum size.

Another object of the invention is to provide an electromagnetically actuated quick-action hydraulic switching valve which ensures a high level of reliability while involving a low level of manufacturing cost, by virtue of using a small number of components of simple configurations.

Still a further object of the present invention is to provide an electromagnetically actuated, quick-action hydraulic valve which affords precision in operation thereof without however requiring a very high level of precision in its construction.

Still another object of the invention is to provide an electromagnetically actuated hydraulic valve which affords versatility in regard to use thereof.

In accordance with the present invention, in a first aspect, these and other objects are achieved by an electromagnetically actuated, quick-action hydraulic switching valve comprising at least one pressure-balanced seating valve means and an electromagnetic actuator means having a core which forms a working air gap cavity which may be filled with hydraulic fluid, with an armature for actuating the valve. The armature is part of the core and is in the form of a sleeve-like member longitudinally slidably disposed by means of a central bore therein on a fixed guide pin. The central bore in the displaceable sleeve member has an annular edge adapted to co-operate with an annular surface provided on the guide pin, thereby to form the seating valve.

In a further aspect the foregoing and other objects of the invention are attained by an electromagnetically actuated quick-action valve comprising at least one pressure-balanced seating valve and an electromagnetic actuator means including a core which forms a working air gap, with an armature for actuating the valve. The armature is part of the core and is in the form of a sleeve-like member which is longitudinally slidably disposed by means of a central bore therein on a fixed guide pin. The central bore in the sleeve member provides a first annular edge. Disposed centrally in the housing of the assembly is a ball having an axial bore extending therethrough, being so positioned that the first annular edge provided by the central bore in the sleeve member is adapted to co-operate with the surface of the ball, thereby to provide the seating valve.

As will become more clearly apparent hereinafter in connection with preferred embodiments of the invention, a high degree of precision is attained at the valve gap or opening defined between the annular edge at the end of the central bore in the sleeve member, and the annular surface on the guide pin or the surface of the ball, particularly when the guide pin is in the form of an integral member which can be easily and very accurately produced in the form of a turned member or a rotationally symmetrical member. It is immaterial whether the guide pin is fitted in the housing of the valve in a precisely central and concentric position at exactly the correct angle. In addition, the construction according to the invention does not have any intermediate members which also have to be produced with a high level of accuracy. The construction which includes the ball co-operating with the annular edge of the central bore in the sleeve member also affords the same advantages as the construction in which the annular edge of the bore in the sleeve member co-operates with the annular surface of the guide pin, insofar as, by virtue of its geometrical shape, the ball automatically ensures that the annular edge of the central bore provides a precisely uniform sealing relationship with the ball even when the ball is not arranged in a precisely aligned position, for example if the bore into which the ball is fitted by being pressed therein departs in regard to its angular position from the axis of the guide pin or within limits is displaced with respect to the guide pin.

In a preferred feature of the invention, the annular surface on the guide pin may be arranged as a taper or conical surface on the guide pin. In another preferred feature, the armature may be a cylindrical turned or rotationally symmetrical member comprising a head portion of a generally plate-like configuration, which forms a parasitic air gap with the housing of the electromagnetic actuator means, and a neck portion which is of reduced transverse dimension in relation to the head portion and which carries a coil spring, the coil spring bearing against the housing and urging the armature into a rest position.

It may be noted at this point that the valves according to the invention may be designed to perform two different functions. In one case, the valve is closed when there is no current flowing through the electromagnetic actuator means, which can be referred to as the 'currentless closed' condition of the valve, while in the other case the valve is open when there is no current flowing through the electromagnetic actuator means, which can be referred to as the 'currentless open' condition of the valve. The same armature can be used for both those functional configurations. That aspect will be described in greater detail hereinafter.

In another preferred feature of the invention the housing of the electromagnetic actuator means comprises two shell portions of soft-magnetic material, which form the end parts of the housing and between which a cylindrical magnet winding is arranged in concentric relationship. The shell portions are connected by way of a magnetic return means which encloses the actuator winding.

The two shell portions may be connected to form a structural unit by a cylindrical portion consisting of non-magnetic material. The actuator winding is arranged on that structural unit, more specifically in the region of the cylindrical portion thereof, and can then be separately replaced. For example the coil body of the actuator winding is simply pushed on to the housing which is formed in that way.

In accordance with another feature of the invention the guide pin for the sleeve member may be pressed into the housing of the electromagnetic actuator means. A central bore in the guide pin represents a duct for a feed and/or discharge flow therethrough.

As indicated above, in a preferred feature of the invention the annular surface on the guide pin may be disposed on a taper or conical surface thereof. In the valve construction using a ball with a bore extending axially therethrough, it is possible to use a ball of the same kind as those used in a ball bearing assembly, with the axially extending bore being produced for example by spark erosion.

In another feature of the invention, in a construction in which the armature includes a neck portion, the working air gap may be disposed between the end face of the neck portion of the armature on the one hand and a central end face of the housing of the electromagnetic actuator means on the other hand. The width of the air gap can be adjusted by means of adjustable stops. It is also possible to provide however that the neck portion of the armature decreases in transverse dimension, for example by virtue of a tapering configuration, towards the end thereof, and is disposed in a hollow cylindrical extension portion which extends around same and the end edge of which co-operates with a corresponding annular surface defined by the housing of the electromagnetic actuator means, to define the working air gap. The part of the armature which is operative in the electromagnetic actuator means is then of a tubular configuration in the region of the above-mentioned extension portion. The annular edge defined by the central bore in the sleeve member forming the armature at the tapered end of the neck portion can then form part of the seating valve so that the valve is disposed coaxially in the hollow cylindrical extension portion.

In order to ensure that, when large volumes of fluid are flowing through the valve, the armature is not entrained by the fluid which flows along the wall surface thereof so that at high flow rates the valve closes of its own accord, thereby prematurely restricting the through-flow rate, a further embodiment of the invention can provide that the annular edge defined by the central bore in the sleeve-like member forming the armature is surrounded by a stationary ring which causes a change in the direction of flow of the hydraulic fluid and thereby compensates for the flow forces which are applied to the wall surface of the armature. At the same time that design configuration provides that the valve behaves in the same manner, for both directions of flow of fluid therethrough.

Further objects, features and advantages of the invention will be apparent from the following description of preferred embodiments thereof.

BRIEF DESCRIPTION OF THE DRAWINGS

FIGS. 3 and 4 are views corresponding to those shown in FIGS. 1 and 2 of a further embodiment of a valve according to the invention for the 'currentless open' and 'currentless closed' modes of operation respectively;

DESCRIPTION OF PREFERRED EMBODIMENTS

Figure 1:
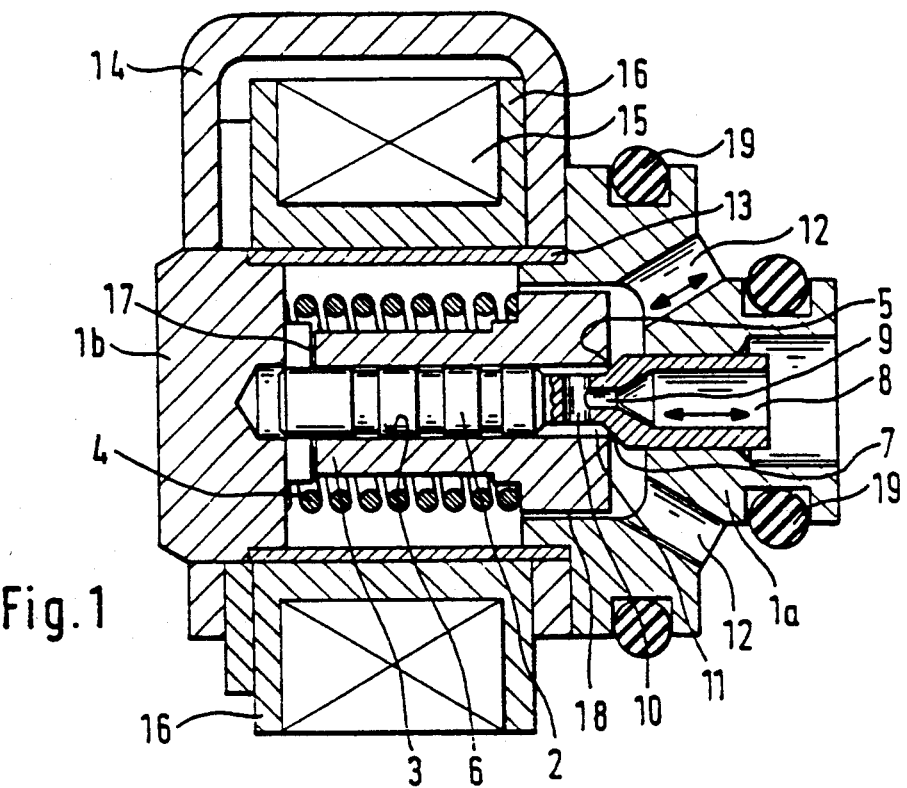
FIG. 1 is a view in longitudinal section through a quick-action switching valve in accordance with the invention, for performing the 'currentless closed' mode of operation.
Figure 2:
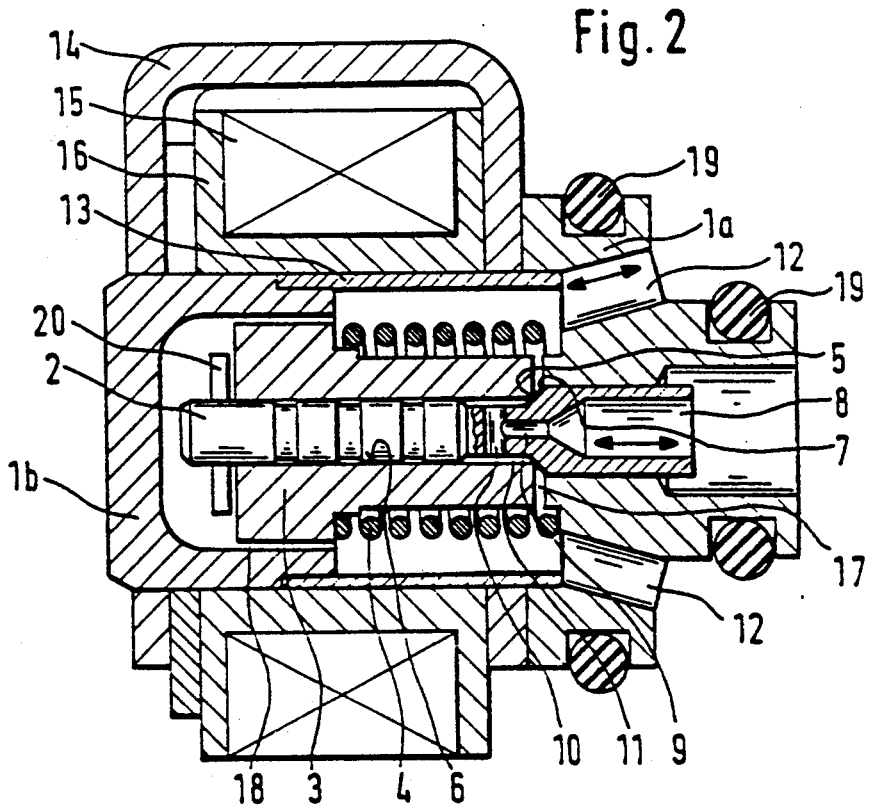
FIG. 2 is a view in longitudinal section through a modified embodiment of the valve shown in FIG. 1, for performing the 'currentless open' mode of operation.

Referring to FIGS. 1 and 2, a first embodiment of an electromagnetically actuated, quick-action hydraulic switching valve according to the invention comprises a housing 1 including first and second shell portions 1a and 1b of soft-magnetic material, which constitute respective end parts of the housing 1. Fitted in a press fit in the shell portion 1a at the right in FIGS. 1 and 2 is a central guide pin 2 which is thus disposed in concentric relationship with the housing and on which an armature 3 in the form of a sleeve-like member is longitudinally slidably mounted. The armature member 3 is a cylindrical turned or rotationally symmetrical member comprising a head portion of a generally plate-like enlarged configuration, and a neck portion of smaller transverse dimension. A coil spring 4 which is disposed around the neck portion of the armature 3 bears at one end against the shell portion 1b and at the other end against a suitable part of the armature 3, adjacent the head portion thereof. The coil spring 4 thus urges the armature 3 towards the shell portion 1a.

The armature 3 has a central or concentric bore 6 which extends axially therethrough. At the right-hand end of the armature 3 in FIGS. 1 and 2 the bore 6 provides an annular edge 5 which can thus bear against an annular surface in the form of a taper or conical surface as indicated at 7 on the guide pin 2. The cooperation between the annular edge 5 and the surface 7 on the guide pin 2 closes the valve.

The guide pin 2 also has a bore extending into same, as indicated at 8 in FIGS. 1 and 2. The hydraulic fluid can be fed to or discharged from the illustrated valve through the bore 8 in the guide pin 2. Reference numeral 9 denotes a constriction adjoining the bore 8, to determine the fluid through-flow cross-section when the valve is in the opened condition. Adjoining the constriction 9 is a transverse bore 10 in the guide pin 2, through which the fluid can flow into an annular space or chamber 11 around the guide pin and then, when the valve is in an opened condition, to inclined feed or discharge bores 12 provided in the shell portion 1a. The valve is pressure-compensated so that its switching times are not affected by different pressures obtaining in relation to the valve.

The first and second shell portions 1a and 1b are connected together to form a structural unit by means of a cylindrical portion 13 of non-magnetic material. The shell portions 1a and 1b are connected by way of a magnetic return means in the form of a U-shaped member indicated at 14. A cylindrical energisation coil 15 carried on a coil former 16 is disposed in concentric relationship in the U-shaped member 14. The coil arrangement 15 and 16 may be fitted in the form of a separate component on to the cylindrical portion 13, and can be readily replaced as required.

When the coil 15 is energised, the magnetic flux goes from the shell portion 1b by way of a working air gap 17 defined between a face of the shell portion 1b and the end face of the armature 3, and then by way of a parasitic air gap at 18 between a surface of the shell portion 1a and a surface of the head portion of the armature 3, to the shell portion 1a. The member 14 represents the magnetic flux return path. All the above-indicated components with the exception of the air gaps comprise soft-magnetic material whereas the guide pin 2 may be made from another material in order to provide the optimum properties in regard to sealing and guidance actions.

Reference numeral 19 identifies O-rings which ensure that the assembly is suitably sealed after it has been fitted into a casing (not shown) of corresponding configuration.

The embodiment shown in FIG. 1 represents a valve which is designed to operate in such a way that it is in a closed condition when there is no current flowing in the electromagnetic actuator means, insofar as the coil spring 4 urges the armature 3 towards the right in FIG. 1 so that the seating valve defined by the co-operation of the annular edge 5 of the central bore in the armature 3 with the surface 7 on the guide pin 2 is closed.

Looking now at FIG. 2, illustrated therein is an embodiment which, while being essentially similar to the construction shown in FIG. 1, is designed to provide for a mode of operation in which the valve is open when no current flows in the electromagnetic actuator means. In view of the similarity between the FIGS. 1 and 2 constructions, components which in FIG. 2 are the same or essentially similar to corresponding components in FIG. 1 are denoted by the same reference numerals. The following description relating to FIG. 2 will therefore only concentrate on the aspects in which the FIG. 2 valve differs from that shown in FIG. 1.

Referring now therefore to FIG. 2, the armature 3 of the illustrated valve is identical to the armature 3 in FIG. 1, except that it has been turned round through 180° so that its head portion is towards the left in FIG. 2, whereas in FIG. 1 it is towards the right. The armature 3, in the form of a sleeve member, is once again mounted by means of its central bore 6 on the guide pin 2 and the coil spring 4 now bears against the shell portion 1a at the right in FIG. 2 and thereby urges the armature 3 towards and against a stop 20 which is fixed on the guide pin 2 towards the left-hand end thereof in FIG. 2. With that construction, when no current is flowing in the electromagnetic actuator means, the annular edge 5 defined by the central bore 6 is lifted away from the taper surface 7 on the guide pin 2 and the valve is thus in an open condition. The working air gap 17 is now disposed on the same side of the arrangement as the annular edge 5, as can be clearly seen from FIG. 2. The working air gap 17 can be easily adjusted by a procedure which provides that, after the guide pin 2 has been pressed into the shell portion 1a, the armature 3 with the coil spring 4 is pushed on to the guide pin 2 and pressed with its right-hand end face against the adjoining surface of the shell portion 1a. The stop 20 is then pushed against the left-hand end face of the armature 3, with the interposition of a loose sheet metal strip (not shown) corresponding to the desired width of the air gap 17, and then the stop 20 is fixed in that position. When the loose sheet metal strip is removed, that then defines the correct working air gap 17 between the end face of the armature 3 and the adjoining surface of the shell portion 1a, thus also providing the correct valve stroke movement corresponding to the thickness of the sheet metal strip which was initially fitted and subsequently removed.

Referring now to FIGS. 3 and 4, illustrated therein are further embodiments of the valve in accordance with the present invention, with components which are the same or similar being denoted in each of FIGS. 3 and 4 by the same reference numerals as those used in relation to FIGS. 1 and 2. Unlike the embodiments shown in FIGS. 1 and 2, in the valves illustrated in FIGS. 3 and 4 the fluid flows through the valve from one side of the valve to the other, as indicated by the arrows shown in FIGS. 3 and 4. The direction of flow of the fluid through the valve may also be the reverse from that illustrated in each of FIGS. 3 and 4.

Referring to FIG. 3, in the embodiment of the valve illustrated therein, the valve is in an open condition when no current flows in the electromagnetic actuator means because the coil spring 4 urges the armature 3 towards the right in FIG. 3 on the guide pin 2 whereby the annular edge 5 defined by the central bore 6 in the armature 3 lifts away from the taper surface 7 defined by the guide pin 2. Once again a stop as indicated at 20 in FIG. 2 limits the width of the working air gap 17 and thus defines the operating stroke movement of the valve. In this embodiment the magnetic flux returns by way of a sheet metal ring member 34 which connects the two shell portions 1a and 1b of the housing.

FIG. 4 shows a modified form of the FIG. 3 valve to perform the mode of operation in which the valve is in a closed condition when no current flows through the electromagnetic actuator means. In this construction the guide pin 2 is pressed into the shell portion 1b which is at the right in FIG. 4 and the armature 3 is urged by the coil spring 4 towards the right in FIG. 4 so that its annular edge 5 defined by the central bore 6 therein is pressed against the taper or conical surface 7 provided by the guide pin 2. The working air gap 17 is defined between the left-hand end face of the armature 3 and a cylindrical projection portion 21 which extends towards the right from the shell portion 1a in FIG. 4. The connection to the valve shown in FIGS. 3 and 4 may also be made by means of a screwthread at one or both sides thereof, as shown by the valve at the left-hand side in FIG. 4.

Figure 5:
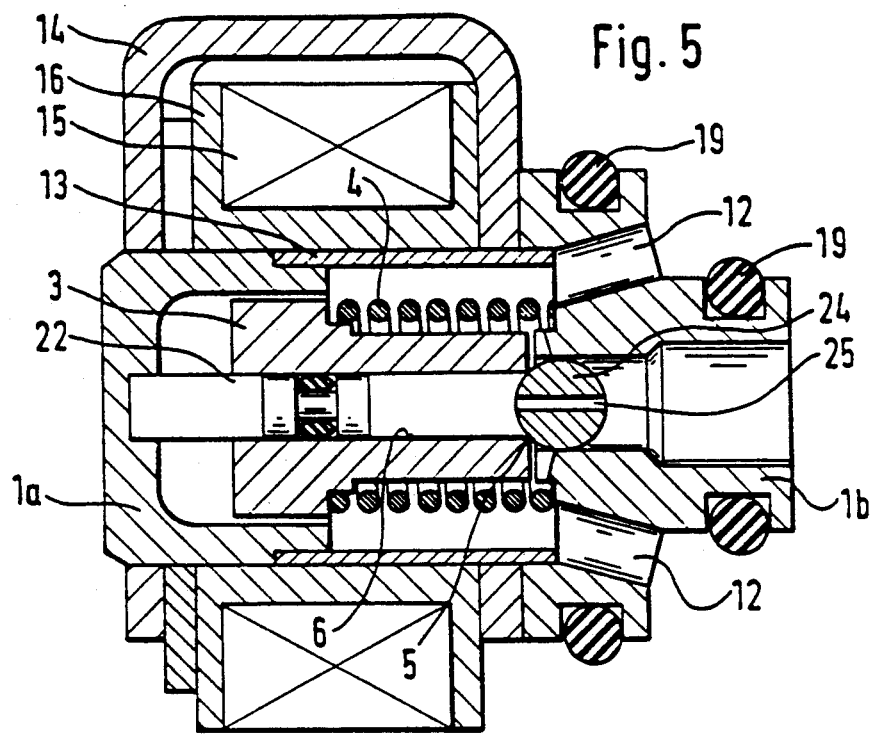
FIGS. 5 and 6 are similar views to those shown in FIGS. 1 and 2 of a third embodiment of a valve according to the invention for performing the 'currentless open' and 'currentless closed' modes of operation.
Figure 6:
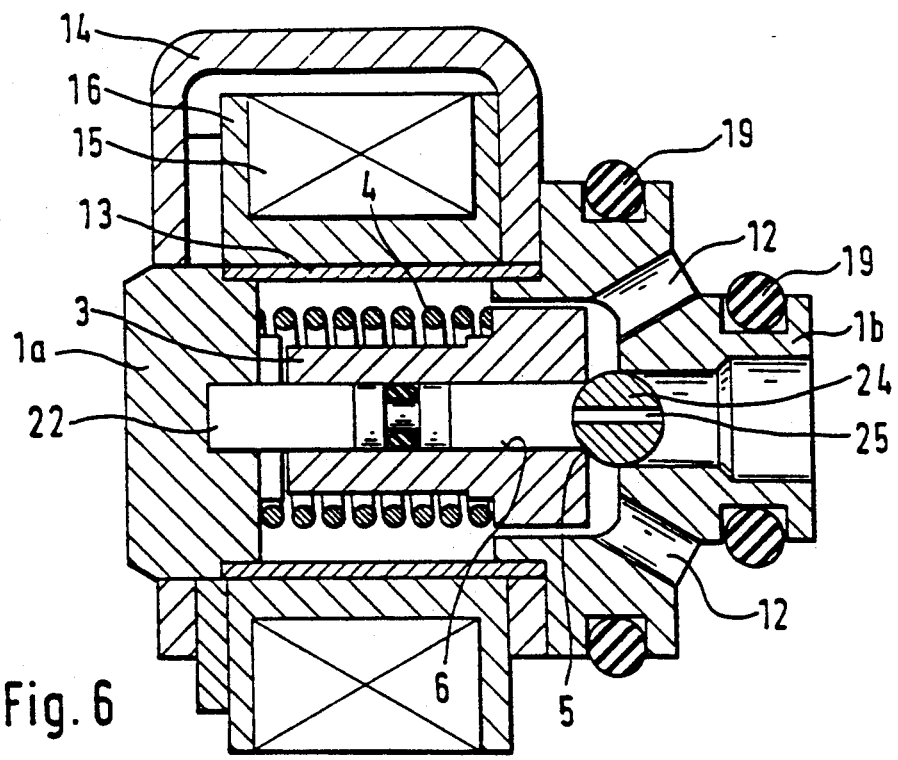

The embodiments of the valves illustrated in FIGS. 5 and 6 correspond in their essential components to the embodiments shown in FIGS. 2 and 1 respectively. However the means for guiding the armature 3 in its operating movement, and the valve seat configuration, are modified in relation thereto.

Referring now to FIG. 5, the general construction of the FIG. 5 valve being generally similar to that shown in FIGS. 1 and 2, reference may be made to the latter to appreciate the construction of the FIG. 5 valve. However, in the FIG. 5 embodiment a modified guide pin 22 is fixed in the shell portion 1a which is at the left in FIG. 5. At the same time the guide pin 22 also provides for a sealing action in relation to the armature 3 in the form of a sleeve member slidable thereon. The guide pin 22 may comprise for example plastic material or metal, with inserted O-rings (not shown) to provide the sealing action. The annular edge 5 defined by the central bore in the sleeve-like armature 3 co-operates with a steel ball 24 which is suitably fixed in the shell portion 1b. The ball 24 has a central bore 25 through which the hydraulic fluid flows into the central bore 6 in the armature 3. When the valve is in an open condition, the fluid can then flow away through the inclined bores 12.

The embodiment illustrated in FIG. 5 performs the mode of operation in which the valve is open when there is no current flowing in the electromagnetic actuator means because the coil spring 4 urges the armature 3 with its annular edge 5 away from the ball 24, that is to say towards the left in FIG. 5.

In contrast, in the FIG. 6 valve, the coil spring 4 urges the armature 3 with its annular edge 5 towards and into contact with the ball 24, that is to say towards the right in FIG. 6, so that the valve is closed when there is no current flowing in the electromagnetic actuator means.

Figure 7:
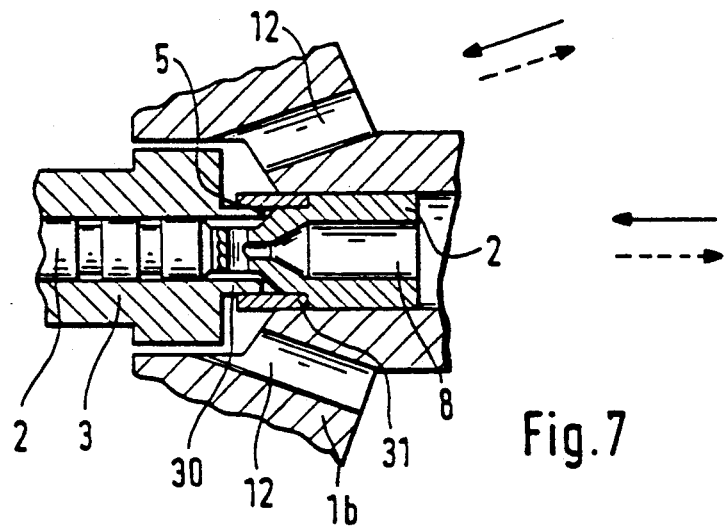
FIG. 7 shows a sectional view of part of a valve according to the invention in the region of the seating valve configuration thereof.

FIG. 7 shows a modified form of the region of the seating valve of the valve assemblies according to the invention. In the FIG. 7 construction, the armature 3 has a collar portion 30 which extends from the end face of the armature 3 towards the right in FIG. 7, around the central bore 6 in the armature 3. The collar portion 30 thus provides an extension of the armature 3 towards the right. At its end, the collar portion 30 provides an annular edge as indicated at 5 which, as in the above-described embodiments, is capable of co-operating with the taper or conical surface 7 afforded by the guide pin 2. If, when the valve is in an open condition, hydraulic fluid flows through the gap between the annular edge 5 and the surface 7, then that flow causes the armature 3 to be entrained in the direction of the flow, for example, towards the right in the view shown in FIG. 7, for the flow direction shown by the solid line arrows. In that way the valve would close of its own accord at high flow rates. In order to prevent the through-flow rate of fluid being restricted in that way, arranged at a stationary position on the guide pin 2 is a ring 31 which, after the hydraulic fluid leaves the gap valve or opening between the annular edge 5 and the surface 7, causes a change in the direction of flow of the hydraulic fluid (towards the left in the drawing) so as to cause compensating entrainment of the armature 3. In that way the through-flow rates of hydraulic fluid can be substantially increased. In addition, the valve shown in FIG. 7 behaves in the same manner for both directions of flow of hydraulic fluid therethrough. The design configuration shown in detail in FIG. 7 may also be used in all the embodiments described herein.

Figure 8:
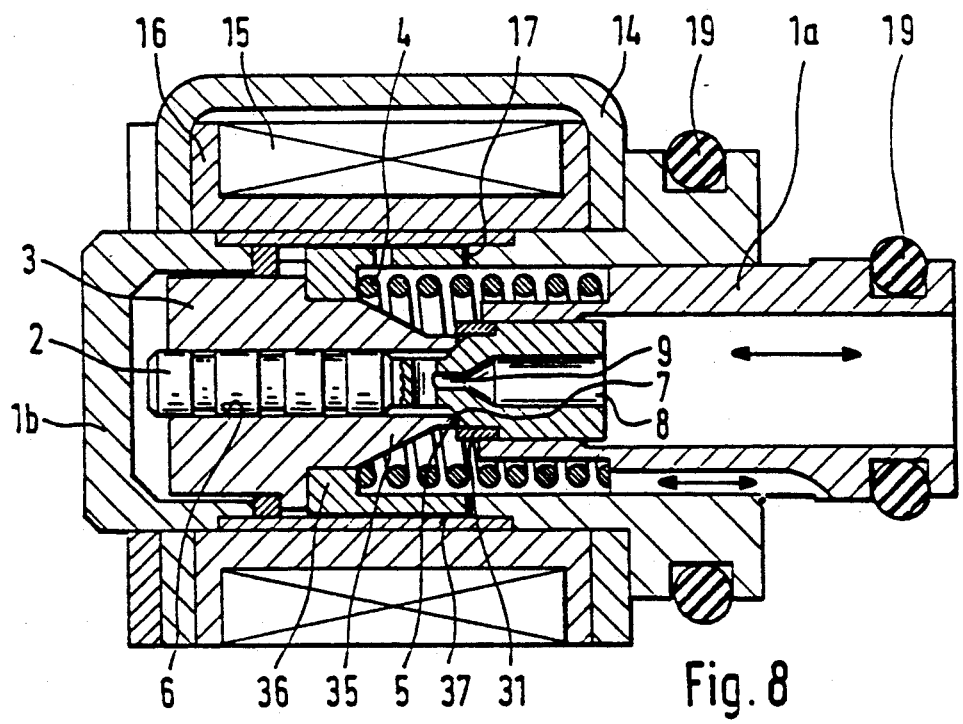
FIG. 8 is a sectional view of a fourth embodiment of a valve according to the invention for the 'currentless open' mode of operation.

In the embodiment illustrated in FIG. 8, which operates in such a way that the valve is open when no current flows in the electromagnetic actuator means, the armature 3 is provided in the region of the neck portion thereof with a portion 35 which decreases towards the right in a tapering configuration and at the end of which the annular edge 5 defined by the bore 6 co-operates with the conical or taper surface 7 to form the seating valve. The tapering end portion of the armature 3 also performs the function of the collar portion 30 shown in FIG. 7 and is also surrounded by a stationary ring 31. Arranged on the neck portion of the armature 3 in coaxial relationship therewith, so that it is disposed around the tapering portion of the armature 3, is a hollow cylindrical extension portion or cup portion as indicated at 36. The end surface 37 thereof which is towards the right in FIG. 8 and which co-operates with a suitably matching annular surface provided by part of the housing of the assembly defines the working air gap 17. Besides the flow force compensation effect as described above in relation to the FIG. 7 embodiment, the tapering portion 35 provides for improved pressure equalisation or balance by virtue of the fact that the speed component which occurs very quickly reduces the influence thereof. In addition, the displacement of the working air gap 17 to the outside diameter in the manner indicated, by virtue of the working air gap 17 being defined by the co-operation of a surface of the housing and the end face 37 of the hollow cylindrical portion 36, also permits separation of the valve function from the electromagnetic actuator function.

It will be appreciated that the above-described embodiments have been set forth solely by way of example and illustration of the principles of the present invention and that various modifications and alterations may be made therein without thereby departing from the spirit and scope of the invention.

What is claimed is:

1. A valve comprising a housing having fluid inlet and outlet duct means and providing a chamber therein, a guide member disposed in said chamber in fixed relationship with said housing, an electromagnetic actuator means for actuating said valve including an actuator winding carried by said housing, a sleeve member having a bore therethrough and longitudinally slidably carried on said guide member by means of said bore, said sleeve member constituting an armature of said electromagnetic actuator means and including an annular end surface, and a seating valve configuration adapted to control the fluid flow communication between said inlet and outlet duct means of said housing, said seating valve configuration being defined by the intersection of said annular end surface with said bore which forms an annular edge circumscribing said bore through said sleeve member and a co-operating portion of said guide member having a rigid frustoconical surface which constitutes a valve seat engageable by said annular edge and passage means for balancing the pressure applied to opposite ends of said sleeve member.

2. An electromagnetically actuated quick-action hydraulic switching valve including an electromagnetic actuator means, said valve comprising:
a housing;
an armature moveable within said housing between an open and closed position in response to said electromagnetic actuator means, said armature having a central bore and an end surface extending normal to said central bore, said central bore having a predetermined internal diameter, an annular edge being formed at the intersection of said central bore with said end surface;

a guide pin having at least one end fixed to said housing and adapted to be received in said central bore of said armature, said guide pin having an annular groove provided adjacent to said at least one end having a diameter less than said predetermined internal diameter of said central bore of said armature, said at least one end of said guide pin having an outer diameter greater than said internal diameter of said central bore and a rigid frustoconical surface extending from said annular groove in a direction away from said armature to said outer diameter; and wherein said annular edge of said armature sealingly engages said frustoconical surface when said armature is in a closed position to form a pressure-balanced valve.

3. A valve as set forth in claim 2 wherein said housing means comprises first and second end shell portions of magnetically conductive material, and further including a central magnetic winding arranged in concentric relationship between the shell portions and a magnetic return means embracing the magnetic winding and connecting the end shell portions.

4. A valve as set forth in claim 3 and further including a cylindrical portion of non-magnetic material which connects said end shell portions to form a structural unit.

5. A valve as set forth in claim 4 wherein said magnetic winding is arranged on said cylindrical portion as a structural unit.

6. A valve as set forth in claim 2 wherein said guide pin is pressed in said housing.

7. A valve as set forth in claim 2 wherein said guide pin has a longitudinal bore provided partway therethrough for receiving a flow of hydraulic fluid therein.

* * * * *